April 10, 1934.   F. A. GAUGER   1,954,446
THERMOSTAT
Filed Jan. 2, 1932

Inventor
Frank A. Gauger
By Arthur R. Woolfolk
Attorney

Patented Apr. 10, 1934

1,954,446

UNITED STATES PATENT OFFICE 1,954,446

THERMOSTAT

Frank A. Gauger, Milwaukee, Wis.

Application January 2, 1932, Serial No. 584,456

7 Claims. (Cl. 200—139)

This invention relates to thermostats and is particularly directed to a snap action thermostat.

Objects of this invention are to provide a novel form of thermostat which is so constructed that a snap action occurs both for the making and the breaking of a contact when the thermostatic member operates, to thereby avoid pitting of the contacts or any arcing whatsoever at such contacts.

Further objects are to provide a snap action thermostat in which a thermostatic member carries a snap action element which operates with a very light pressure, indeed, although it effects a positive contact at each action thereof, and in which the thermostatic member itself carries the snap action element, thereby avoiding a complicated construction and greatly lessening the overall dimensions of the structure.

Further objects are to provide a snap action thermostat in which a thermostatic member is punched out and is provided with socket members which receive the ends of a bowed spring mounted in the punched out portion of the thermostatic element and adapted to snap from one side to the other and engage one or the other of two stationary members, either or both of which may be employed as stationary contacts, thus adapting the thermostat for use in a two-wire or three-wire control system without any alteration of the structure of the thermostat whatsoever.

Further objects are to provide a thermostat in which a freely adjustable member is carried by a base and in turn carries an auxiliary support which may be adjusted and locked to the adjustable member, in which the auxiliary support carries a thermostatic member whose relative position with respect to the adjustable support may be varied as required without in any way interfering with the free adjustment of the adjustable member for different temperature settings, and in which relatively stationary contacts are provided which cooperate with means actuated from the thermostatic member.

In greater detail, objects of this invention are to provide a snap action thermostat in which a lever is pivotally carried in an adjustable manner by a base and may be set at any desired temperature setting, in which an auxiliary support is pivotally carried by the lever and is adjusted by eccentric means and may be locked to such lever, in which a thermostatic member is carried by the auxiliary support and itself carries a bowed spring provided with oppositely looped portions adjacent one end thereof and adapted to cooperate with relatively stationary contacts carried by the base portion or body portion of the device.

Further objects are to provide a thermostat which, although it is a snap action thermostat, is nevertheless of very simple and easily produced construction, which is very small in its overall dimensions, which is positive in its action, which is substantially foolproof and not likely to get out of order, which secures a firm face to face contact whenever it operates, and which may be produced at a relatively small expense, as it is devoid of elaborate or expensive mechanism.

An embodiment of the invention is shown in the accompanying drawing, in which:—

Figure 1:
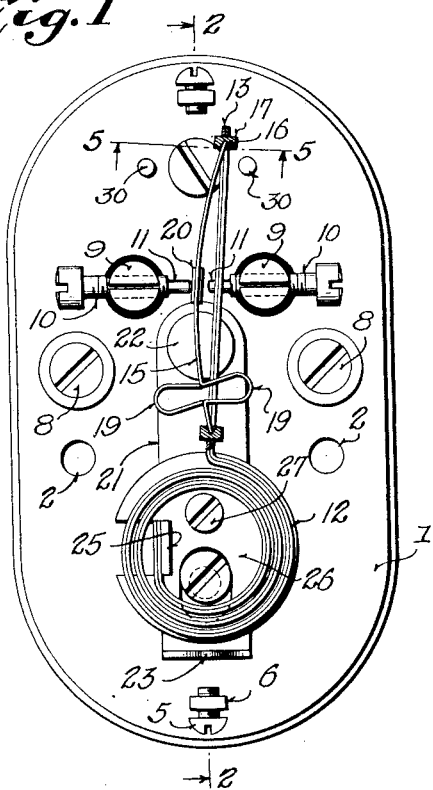
Figure 1 is a view of the apparatus with the casing removed.

Referring to the drawing, it will be seen that the device comprises a hollow sheet metal base 1, which is provided with apertures 2 through which mounting screws may pass to thereby secure the base to a wall, or in any other suitable place. This base is adapted to receive a casing 3 which may be apertured to permit free circulation of air therethrough, and which may, if desired, carry a thermometer 4. The casing or cover 3 is held in place in any suitable manner, as by means of screws 5 which are adapted to be passed through slots in the casing or cover 3, and which are threaded into lugs 6 carried by the base. The base is provided with a terminal member 7 which is electrically connected thereto and which customarily forms the negative terminal of the system. The base also carries two additional terminals 8, either or both of which may be employed, and are normally connected to the positive terminals of the control system, if a three-wire system is employed. If a two-wire system is employed, only one of the two insulated terminals 8 is used.

Figure 2:
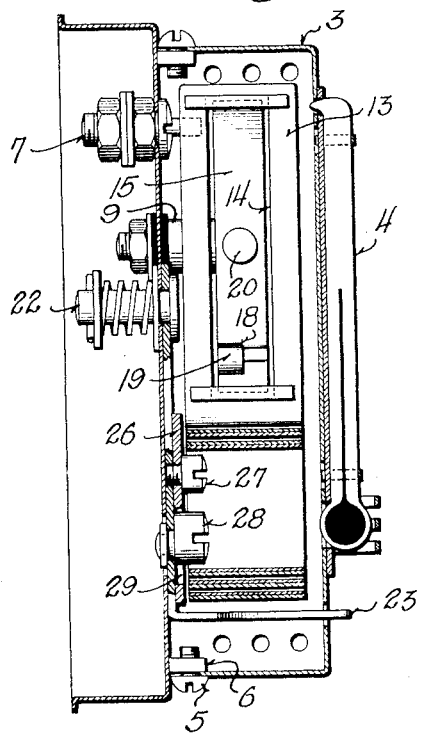
Figure 2 is a sectional view on the line 2—2 of Figure 1.
Figure 5:
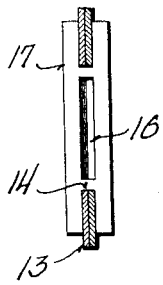
Figure 5 is an enlarged sectional view on the line 5—5 of Figure 1.
Figure 4:
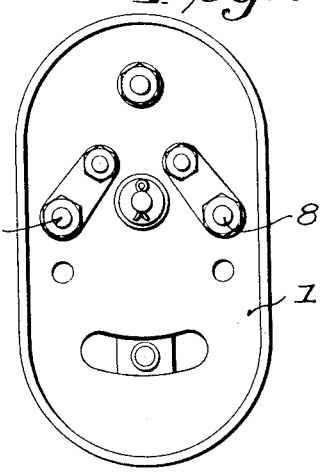
Figure 4 is a rear view of the apparatus.

The terminals 8 are connected to insulated posts 9 which carry the stationary contacts, such stationary contacts being, of course, preferably adjustable, as indicated in Figure 1, with reference to the posts 9. These stationary contacts may in reality consist of screws 10 threaded through a split portion of the posts 9 and provided with contact tips 11. The thermostatic member or element may consist of a coiled, bimetallic member 12 which is provided with a projecting arm or movable portion 13. This movable portion or arm 13, see Figures 1 and 2, is punched out to provide the opening 14, see Figure 2, within which a bowed spring 15 is mounted. This bowed spring preferably has chisel-shaped ends which are received within the V-shaped grooves 16 of socket members 17 carried by the arm 13 of the thermostatic member. The construction of the socket supports 17 is most clearly shown in the enlarged view Figure 5. From this view it will be seen that the socket members 17 are notched to receive the upper and lower portions of the arm 13 and are positioned within the cut out portion of the arm 13. As stated, the ends of the bowed spring 15 are preferably V-shaped, but at all events are mounted within the V-shaped grooves 16 in the socket members 17, and the angle of the V-shaped grooves is such as to permit free bowing of the spring, as shown in Figure 1, towards either side of the arm 13.

The bowed spring 15 is provided with a short, longitudinally extending slit 18, see Figure 2, and the upper and lower portions thereof are looped outwardly in opposite directions, as indicated at 19, to provide yielding compensating means to accommodate the bowing of the bowed spring when it snaps from side to side.

The free mounting of the ends of the bowed spring within the socket member 17 and the compensating, oppositely bowed portions 19 insure a secure contact of a material extent or area between the contact 20 carried by the bowed spring intermediate its ends and one or the other of the contact tips 11.

Figure 3:
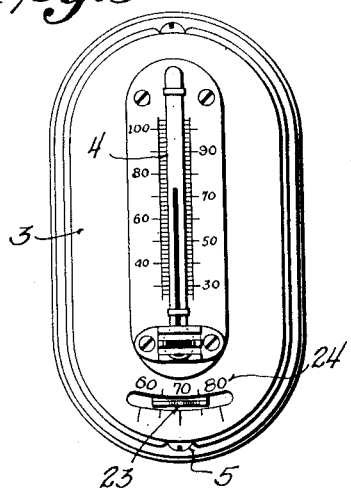
Figure 3 is a front view of the apparatus, (full size).

In order to provide for the setting of the thermostat for various temperatures the thermostatic member is supported from a lever 21 pivoted, as indicated at 22, to the base 1, the lever 21 being preferably provided with an upstanding pointer or manipulating portion 23, which projects through a slot in the cover 3 and may be manually or otherwise operated, as desired. In the form shown, manual operation has been chosen for illustration. The casing 3, see Figure 3, is preferably provided with markings 24 to correspond to temperature settings of the thermostat.

It is to be noted, however, from Figures 1 and 2, that the thermostatic member 12 is not directly mounted upon the lever 21, although it is bodily carried or supported from such lever. The thermostat member 12 is rigidly secured at its innermost convolution to an upstanding ear 25 integral with an auxiliary support 26, which may consist of a small plate pivotally mounted upon the lever 21. This auxiliary support is pivoted upon the screw 27, see Figures 1 and 2, and the screw 27 serves the double function of a pivot point and also, due to its shouldered head, as a locking means for locking the auxiliary support 26 in place after it has been initially adjusted with respect to the lever 21. It obviously would be a relatively difficult task to accurately adjust the auxiliary support with the precision needed for this type of construction.

However, this adjustment is easily effected by means of an eccentric 28 which is revolubly carried by the lever 21, see Figures 1 and 2, and which fits within a slot 29 formed in the auxiliary support 26.

Thus in initially adjusting the thermostatic member with reference to the lever 21, it is merely necessary to insert a screw driver into the eccentric head 28, see Figure 2, and adjust the auxiliary support 26 with reference to the lever 21, thereby adjusting the thermostatic member with reference to the lever 21. Thereafter the screw 27 may be tightened to lock the parts in their relative adjusted position. This adjustment, however, does not in any manner interfere with the free adjustment of the lever 21 to the desired temperature settings.

It is preferable to provide stops 30, see Figure 1, on opposite sides of the lever or arm 13 of the thermostatic member to limit the motion of such member and guard against unnecessary distortion of the parts, even under exaggerated or unusual conditions.

The operation of the apparatus is as follows:

Assume that the thermostatic member and the bowed spring are in the position shown in Figure 1, and that the thermostatic member travels or rocks towards the right. The bowed spring 15 is gradually forced past its center position and snaps towards the right, as viewed in Figure 1, thereby causing contact with the righthand, relatively stationary contact member. Obviously a reverse motion of the thermostatic member causes a reverse snap action of the bowed spring.

The bowed spring may be very light so as not to interfere with the free response of the thermostatic member to relatively minute temperature changes, for example, fractional degree changes. However, due to the snap action of the bowed spring a very positive and secure contact is effected under all conditions of operation, and this snap action prevents pitting of the contacts or arcing at the contacts.

It will be seen that a snap action thermostatic member has been provided by this invention which is of extremely simple construction, which is easy to produce, which is substantially foolproof and is not likely to get out of order, and which may be made to provide unusually good sensitivity to relatively small temperature changes. As a matter of fact, a thermostat constructed in accordance with this invention, although having this snap action, actually responds to a small fraction of one degree temperature change.

Although this invention has been described in considerable detail, it is to be understood that such description is intended as illustrative rather than limiting, as the invention may be variously embodied and is to be interpreted as claimed.

I claim:

1. A snap action thermostat comprising a thermostatic member, a bowed spring carried by said member and having a contact intermediate its ends, a relatively stationary member located on opposite sides of said bowed spring for causing said bowed spring to snap from one side to the other as said thermostatic member moves, at least one of said stationary members constituting a contact cooperating with the contact carried by said bowed spring, said bowed spring having oppositely directed compensating loops adjacent one end thereof.

2. A snap action thermostat comprising a thermostatic member having a cut out portion provided with socket grooves, a bowed spring located adjacent said cut out portion and having its ends seated within said grooves, said bowed spring having oppositely directed compensating loops formed directly in the body of said bowed spring, and relatively stationary members located on opposite sides of said bowed spring for engaging said bowed spring upon movement of said thermostatic member.

3. A snap action thermostat comprising a thermostatic member having a cut out portion provided with V-shaped socket grooves, a bowed spring located adjacent said cut out portion and having its ends seated within said grooves, said bowed spring having oppositely directed compensating loops formed directly in the body of said bowed spring, and relatively stationary members located on opposite sides of said bowed spring for engaging said bowed spring upon movement of said thermostatic member.

4. A snap action thermostat comprising a thermostatic member having a punched out portion, a bowed spring mounted within said punched out portion and adapted to snap from one side to the other, supports carried by said thermostatic member and having socket portions receiving the ends of said bowed spring, and means located on opposite sides of said bowed spring for engagement therewith when said thermostatic member moves, said bowed spring being longitudinally slitted adjacent one end and having the portions on opposite sides of the slit looped in opposite directions.

5. A snap action device comprising a movable member adapted to move back and forth, rigid, spaced supports carried by said movable member, a bowed spring carried between said rigid supports, compensating means formed directly in said spring and located adjacent one end only of said spring, said compensating means compensating the bowed spring while said bowed spring snaps through center position, and stops alternately coacting with an intermediate portion of said bowed spring to snap said bowed spring from one side to the other as said movable member moves back and forth.

6. A snap action device comprising a movable member adapted to move back and forth, rigid, spaced supports carried by said movable member, a bowed spring carried between said rigid supports, oppositely directed compensating loops formed in the bowed spring adjacent one end only of said spring, said spring being longitudinally slit through said loops and said loops being formed in the two portions of said spring formed by the slit, said compensating loops compensating the bowed spring while said bowed spring snaps through center position, and stops alternately coacting with an intermediate portion of said bowed spring to snap said bowed spring from one side to the other as said movable member moves back and forth.

7. A snap action device comprising a unit consisting of a pair of rigid supports, a bowed spring carried between said supports, compensating means consisting of directly opposed, oppositely directed loops formed directly in said spring and located adjacent one end only of said spring, a second unit consisting of a pair of stops adapted to alternately engage an intermediate portion of said bowed spring to snap said bowed spring back and forth past center, and a movable member for moving one of said units back and forth with respect to the other unit.

FRANK A. GAUGER.